US008381281B2

(12) United States Patent
Bonanno et al.

(10) Patent No.: US 8,381,281 B2
(45) Date of Patent: Feb. 19, 2013

(54) AUTHENTICATING A REMOTE HOST TO A FIREWALL

(75) Inventors: James M. Bonanno, Raleigh, NC (US); Steven D. Ims, Apex, NC (US); Todd E. Kaplinger, Raleigh, NC (US); Aaron J. Tarter, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/755,827

(22) Filed: Apr. 7, 2010

(65) Prior Publication Data

US 2011/0252462 A1 Oct. 13, 2011

(51) Int. Cl.
*H04L 29/06* (2006.01)
*G06F 15/16* (2006.01)

(52) U.S. Cl. .............................. 726/11; 726/5; 709/227

(58) Field of Classification Search ........................ None
See application file for complete search history.

(56) References Cited

U.S. PATENT DOCUMENTS

| 6,845,452 | B1 * | 1/2005 | Roddy et al. ..................... 726/11 |
| 6,941,474 | B2 * | 9/2005 | Boies et al. ...................... 726/11 |
| 7,146,638 | B2 * | 12/2006 | Malcolm ........................ 726/11 |
| 7,249,378 | B2 | 7/2007 | Wesigner et al. |
| 7,424,737 | B2 | 9/2008 | Wesinger, Jr. et al. |
| 7,594,268 | B1 | 9/2009 | Sobel |
| 7,886,351 | B2 * | 2/2011 | Dadhia et al. ................... 726/11 |
| 2002/0161904 | A1 * | 10/2002 | Tredoux et al. ................ 709/229 |
| 2006/0168654 | A1 * | 7/2006 | Jennings et al. ................ 726/11 |
| 2006/0182028 | A1 * | 8/2006 | Chan et al. ..................... 370/230 |
| 2007/0294756 | A1 | 12/2007 | Fetik |
| 2008/0046993 | A1 * | 2/2008 | Mullick et al. ................. 726/15 |
| 2008/0052758 | A1 * | 2/2008 | Byrnes ............................. 726/1 |
| 2008/0072311 | A1 * | 3/2008 | Mullick et al. ................. 726/15 |
| 2008/0172731 | A1 * | 7/2008 | Aaron ............................ 726/13 |
| 2008/0263646 | A1 | 10/2008 | Jerez |
| 2009/0037763 | A1 * | 2/2009 | Adhya et al. ..................... 714/4 |
| 2009/0037998 | A1 * | 2/2009 | Adhya et al. ................... 726/11 |
| 2009/0271002 | A1 * | 10/2009 | Asofsky ........................... 700/3 |

OTHER PUBLICATIONS

Jiang et al.; "Distributed Resource Relay Under Personalized Firewalls"; DIALOG/INSPEC, 2003.
Ravi et al, "Security in Embedded Systems: Design Challenges", ACM Transactiosn on Embedded Computing Systems, vol. 3, No. 3, Aug. 2004, pp. 461-491.
Roy et al., "Attack-Resilient Hierarchical Data Aggregation in Sensor Networks"; SASN'06, Oct. 2006, Alexandria Virginia, pp. 71-85.
Cervesato et al., "Specifying Kerberos 5 Cross-Realm Authentication"; Proceedings of the 2005 workshop on Issues in the theory of security, Long Beach CA, Jan. 2005, pp. 12-23.

(Continued)

*Primary Examiner* — Christopher Revak
(74) *Attorney, Agent, or Firm* — Yee & Associates, P.C.; Libby Toub

(57) ABSTRACT

A computer implemented method, system, and computer program product for authenticating a remote host to a firewall. The illustrative embodiments allow a requesting host separated from a target host by a firewall to determine, based on exception handling code, that an original request sent to the target host has been intercepted and blocked by the firewall. The illustrative embodiments also allow the requesting host to automatically provide credentials that authenticate the requesting host to the firewall. The illustrative embodiments are particularly applicable in situations when requests are invoked without any user interaction, such as when a timer expires. In such a case, there is no user to provide the needed credentials to authenticate the requesting host. The illustrative embodiments enable a requesting host to access a target host without requiring user intervention.

20 Claims, 6 Drawing Sheets

OTHER PUBLICATIONS

Moore et al., "Adapting Globus and Kerberos for a Secure ASCI Grid"; Proceedings of the 2001 ACM/IEEE conference on Supercomputing (CDROM), Denver, Nov. 2001, pp. 1-10.

IBM, "Safe Anticipated Xhost"; IP.COM/IBM TDB; IPCOM000020990D, Dec. 16, 2003, 1 page.

* cited by examiner

400

| SUBNET ADDRESS | SUBNET MASK | USERNAME | PASSWORD |
|---|---|---|---|
| 9.42.65.0 | 255.255.255.0 | user1 | password1 |
| 9.54.0.0 | 255.255.0.0 | user2 | password2 |
| ⋮ | ⋮ | ⋮ | ⋮ |

```
function connectThroughFirewall() {
    firewallBlocked = false
    try {
        response = makeConnection(url)
502     if(response.body.contains("Firewall Content") ) {
            firewallBlocked = true
        }
504 } catch(ConnectionTimeOut) {
        firewallBlocked = true
    }
    if(firewallBlocked==true) {
        ip = resolve(host)
        credentials = getCredentialsFromTable(ip)
506     if(credentials!=null) {
            authenticate(credentials.username, credentials.password)
            makeConnection(url)
        }
    }
}
```

*FIG. 5*

AUTHENTICATING A REMOTE HOST TO A FIREWALL

BACKGROUND

1. Field

The disclosure relates generally to an improved data processing system, and more specifically to a method and system for authenticating a remote host to a firewall without requiring user intervention.

2. Description of the Related Art

Networks implementing distributed data processing systems, and in particular the Internet, have attained a widespread diffusion in the last years. A major concern of using the Internet or other public networks in conducting business is that of exposing an organization's internal private network to the outside world. Several security issues are raised by these kinds of applications, which involve attachment of the (secure) private network of the organization to the largely uncontrolled environment of the Internet. Particularly, the organization must be protected from intruders attempting to gain unauthorized access to the private network or attempting to compromise its operation.

Most security measures involve the use of a firewall. A firewall consists of hardware and/or software that monitors and controls data traffic between an external network and an internal private network based on an access control policy. Data traffic such as HTTP (Hypertext Transport Protocol) requests that enter or leave the private network will pass through the firewall, which allows only certain traffic to be transmitted as specified by the access control policy. Firewalls are useful to prevent certain types of network traffic from reaching devices that reside on the internal protected network. For example, the firewall can examine information in the received data packets to stop certain types of information that has been previously determined to be harmful, such as virus probes, broadcast data, pings, etc. As an additional example, entities that are outside of the internal network and lack the proper authorization may attempt to discover, through various methods, the topology of the internal network and the types of resources that are available on the internal network in order to plan electronic attacks on the network. If the firewall determines that data messages from the external network comply with the access control policy, the firewall will forward the data messages to the target device in the protected network. Otherwise, the data messages will be blocked by the firewall.

SUMMARY

According to one embodiment of the aspects of the disclosure, a computer implemented method, apparatus, and computer program product is provided for authenticating a remote host to a firewall without requiring user intervention. A requesting host computer sends a request message to a target host computer, wherein the request message requests one or more resources from the target host computer, and wherein the requesting host computer and target host computer are separated by a firewall that intercepts messages sent to the target host computer. When the requesting host computer receives a response message from the firewall, the requesting host computer determines from the content of the response message that an exception error has occurred, wherein the exception error indicates that the request message has been blocked by the firewall. The requesting host locates an entry in a subnet lookup table that matches a network address of the target host computer and obtains, from the entry, credentials associated with the target host computer. The requesting host sends an authentication request message comprising the credentials to the target host computer, wherein the authentication request message is intercepted by the firewall. When the requesting host receives an authentication response message from the firewall, the requesting host determines from the content of the authentication response message that the credentials in the authentication request message has been authenticated by the firewall. The requesting host then sends the request message to the target host computer, wherein the request message passes through the firewall to the target host computer, and wherein the request message establishes a connection between the requesting host computer and the target host computer.

BRIEF DESCRIPTION OF THE SEVERAL VIEWS OF THE DRAWINGS

FIG. 4 is a diagram of a subnet lookup table in accordance with the illustrative embodiments;

FIG. 5 illustrates exemplary source code for handling firewall authentications on an "as-needed" basis in accordance with the illustrative embodiments.

DETAILED DESCRIPTION

Figure 1:
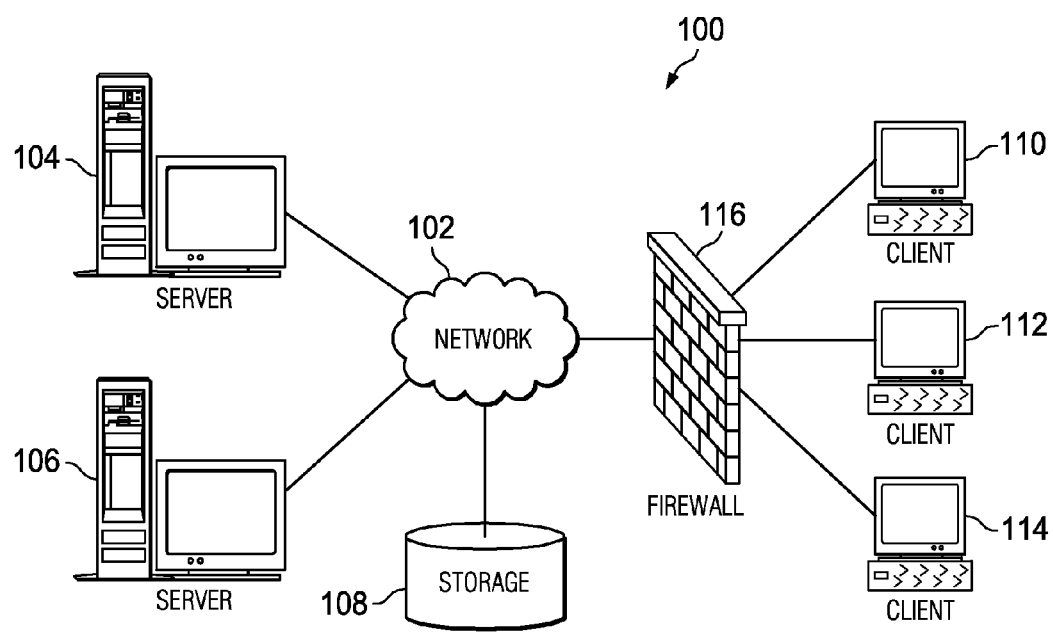
FIG. 1 depicts a pictorial representation of a distributed data processing system in which the illustrative embodiments may be implemented.

As will be appreciated by one skilled in the art, the aspects of the disclosure may be embodied as a system, method or computer program product. Accordingly, the aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the aspects of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
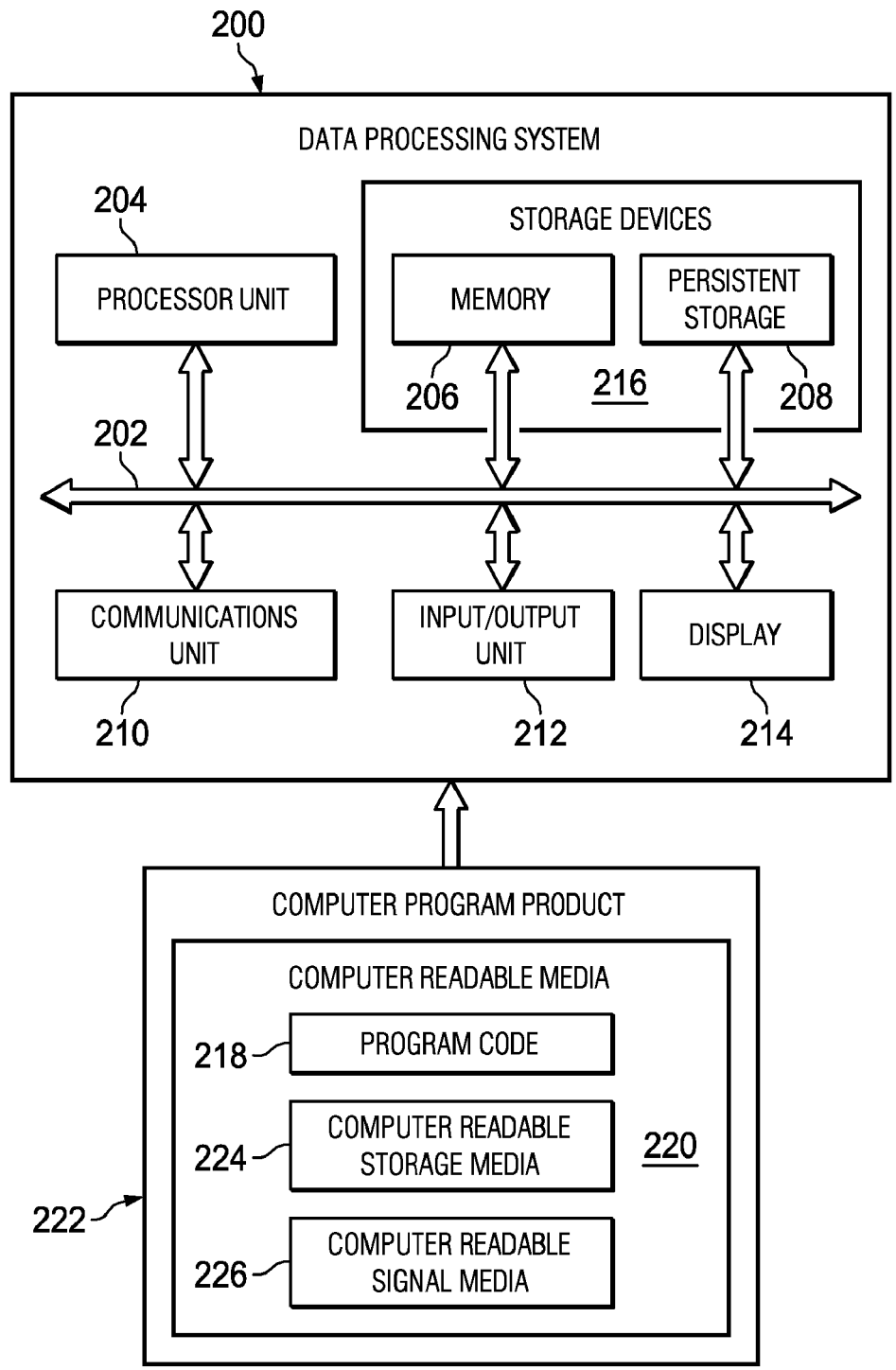
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Clients 110, 112, and 114 are shown in this example to be located behind firewall 116. Firewall 116 comprises hardware and/or software that controls the traffic between the servers 104 and 106 and clients 110, 112, and 114, thereby imposing access controls on hosts external to the firewall. Firewall 116 applies an access control policy to all data packets entering or leaving a device behind the firewall to determine whether to allow the request to pass through the firewall to the target device. If the request complies with the access control policy, firewall 116 forwards the data to the target device. If the request does not comply with the access control policy, firewall 116 blocks the request and sends a response back to the requesting device indicating that the request was denied.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, may be a multi-processor core, or some other type of processor, depending on the particular implementation. A number as used herein with reference to an item means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage medium 224 or computer readable signal medium 226. Computer readable storage medium 224 may include, for example, an optical or magnetic disc that is inserted or placed into a drive or other device that is part of persistent storage 208 for transfer onto a storage device, such as a hard drive that is part of persistent storage 208. Computer readable storage medium 224 also may take the form of a persistent storage, such as a hard drive, a thumb drive, or a flash memory that is connected to data processing system 200. In some instances, computer readable storage media 224 may not be removable from data processing system 200. In these illustrative examples, computer readable storage medium 224 is a non-transitory computer readable storage medium.

Alternatively, program code 218 may be transferred to data processing system 200 using computer readable signal media 226, Computer readable signal media 226 may be, for example, a propagated data signal containing program code 218. For example computer readable signal media 226 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Organizations commonly isolate parts of their network with firewalls to prevent certain entities from obtaining access to resources and information in a protected internal network. To prevent against unwanted access, some firewalls require that users at a requesting host outside the firewall authenticate themselves to the firewall before the host is allowed access to a target host inside the firewall. Authentication is the process of determining the identity of a user that is attempting to access a system. For example, when a user at a requesting host outside a firewall attempts to access a target host inside the firewall, the firewall may require that the user at the requesting host provide login credentials that authenticate the host to the firewall. These login credentials may include, for example, a user name and a user password. The firewall will let the request from the requesting host pass through the firewall to the target host if the requesting host provides the proper credentials to the firewall.

In some instances, however, requests to access a target host inside the firewall may be invoked without any user interaction. For example, when a timer expires that indicates the end of the connection between a target host behind the firewall and a requesting host outside the firewall, application software in the requesting host may send a non-user-initiated request to the target host to reinitiate the connection between the hosts. A problem resulting from this situation is that since the reinitiating request is invoked without user intervention, there is no user to provide the authentication credentials to the firewall to allow the firewall to authenticate the requesting host, and thus the firewall will not allow the requesting host to access the target host. Another aspect that further complicates this problem is that the requesting host may not be able to directly address the firewall to provide the login credentials to the firewall. For instance, in some firewalls, the Internet Protocol (IP) address of the firewall is unknown to users. The only way the requesting host may interact with the firewall is when a request is sent to a blocked target host and the firewall responds as if it were the target host (i.e., using the target host's Internet Protocol (IP) address). Since the IP address of the firewall is not known to users, there is no way for a requesting host to address the firewall or directly authenticate with the firewall. Instead, a requesting host is required to make a request as if the requesting host is authenticating with one of the hosts behind the firewall. Furthermore, a requesting host should not make the firewall authentication request if the requesting host is already authenticated to the firewall, since the firewall will pass the authentication request through to the target host. This authentication request pass through may cause unintended errors, since the target host may not know how to process the request.

An existing solution to the problems above is to add authenticated hosts to a firewall "white list". The white list comprises a list of allowable requesting host addresses added and maintained by firewall administrators at the firewall. Any messages coming from a requester in the white list is presumed to be an authenticated message. For instance, once a request is received, the firewall system looks up the address of the requester in the white list. If the requester address is found in the white list, the request is classified as authenticated and delivered to the intended target host behind the firewall. If, however, the requester address is not found in the white list, the request is blocked at the firewall. A disadvantage of the white list technique is that it can take significant time for the administrators of the firewall to add authenticated requester hosts to the white list. The effectiveness of the white list depends on the entries in the white list—since most of the systems require the user to manually add hosts to his white list, addresses that should be added to the white list may be unintentionally left out, thereby making the white list less effective. Keeping the hosts on the white list current can be an impractical task, as some deployments (especially demo or test scenarios) are torn down and set up quickly, thus requiring the host addresses to be changed frequently.

Aspects of the illustrative embodiments provide a solution to the problems above by providing a computer implemented method, system, and computer program product for authenticating a remote host to a firewall. The illustrative embodiments allow a requesting host separated from a target host by a firewall to determine, based on exception handling code, that an original request sent to the target host has been intercepted and blocked by the firewall. The illustrative embodiments also allow the requesting host to automatically provide credentials that authenticate the requesting host to the firewall. The illustrative embodiments are particularly applicable in situations when requests are invoked without any user interaction, such as when a timer expires. In such a case, there is no user to provide the needed credentials to authenticate the requesting host. The illustrative embodiments provide a solution that enables a requesting host to access a target host without requiring any user intervention.

Credentials used to authenticate a requesting host may comprise login information, such as a username and user password. The credentials may be maintained in a subnet lookup table which is stored locally at and is accessed by the requesting host. The contents of a subnet lookup table may be generated and updated by a user at the requesting host. Each subnet lookup table may comprise a list of IP addresses and subnet masks, wherein each IP address and subnet mask entry indicates the address of a particular target subnet. Each IP address and subnet mask entry also specifies credentials associated with a target subnet. When a requesting host determines that its request to a target host has been blocked by a firewall, the requesting host may access the subnet lookup table to obtain the credentials associated with the blocked target host. To locate the credentials in the subnet lookup table, the requesting host starts at the top of the table and applies the subnet mask to the target host address to determine if the subnet mask and target host address matches the subnet address for that table row. If the subnet mask and target host address does not match the subnet address in that row, the requesting host proceeds to the next row in the table. If the requesting host finds a match, the host may then send these credentials in an authentication request to the blocked target host. The firewall intercepts the authentication request with the provided credentials, authenticates the requesting host, and returns an authentication success response to the requesting host. As the requesting host is now authenticated to the firewall, the firewall allows requests from the requesting host to pass through the firewall to the target host.

The illustrative embodiments provide several advantages over the white list technique. Instead of being required to make white list update requests to an administrator or several administrators of one or more firewalls, with the subnet lookup table technique in the illustrative embodiments, a user at a requesting host maintains and has control over which firewalls the host can pass through. Local maintenance of a subnet lookup table is beneficial since the requesting host may be authenticating with multiple firewalls in different administration domains. The illustrative embodiments are particularly useful for more dynamic installations such as customer demos, where there may be limited time to add the necessary requesting hosts to the white lists of the firewalls. Also, when the requesting hosts IP addresses change, there is no need to update any configuration as there would be with the firewall white lists, since a requesting host's IP address is not stored in or used in the subnet lookup table.

Figure 3:
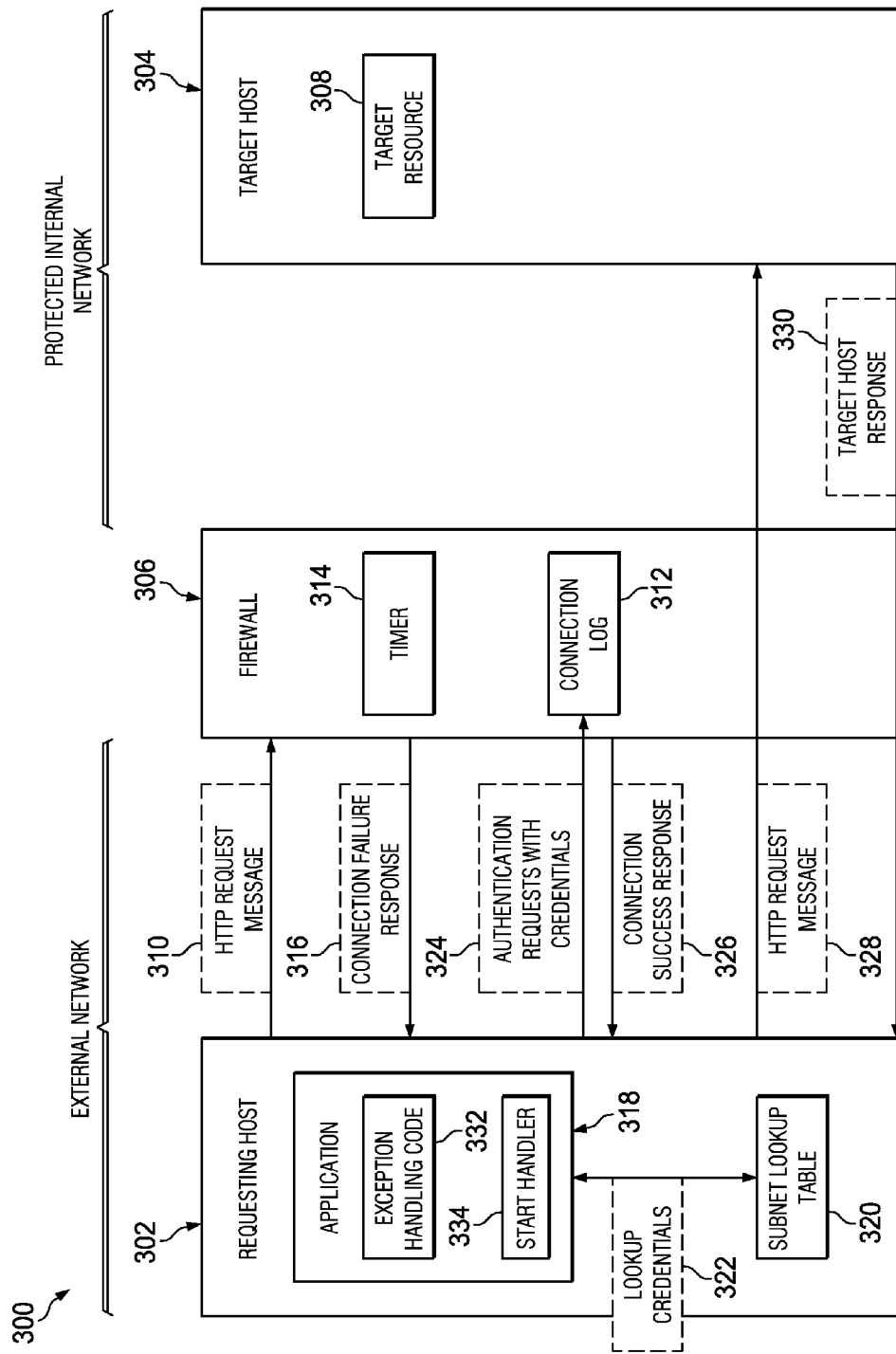
FIG. 3 is a block diagram of exemplary components in a data processing system used to authenticate a remote host to a firewall in accordance with the illustrative embodiments.

FIG. 3 is a block diagram of exemplary components in a data processing system used to authenticate a remote host to a firewall in accordance with the illustrative embodiments. In this illustrative example, data processing system 300 comprises a requesting host computer, host A 302, a target host computer, host B 304, and a firewall 306 located between the requesting host computer and target host computer. However, it should be noted that data processing system 300 is only meant as an example and not intended as a limitation on different illustrative embodiments. In other words, data processing system 300 may include more or fewer components as necessary to accomplish processes of the different illustrative embodiments.

In this illustrative example, host A 302 is a host computer that may request resources from one or more other computers in a network of computers. Host A 302 may comprise any type of computer, including a client computer or a server, such as server 104 or 106 in FIG. 1. Host A 302 is separated from host B 304 by firewall 306. Host A 302 is a requesting host located in network external to host B 304, such as, for example, the Internet. When host A 302 wants to obtain a resource, such as target resource 308, from host B 304, host A 302 may send a resource request message to host B 304. In one embodiment, the request message may comprise a Hypertext Transfer Protocol (HTTP) request. HTTP is an application layer protocol comprising a request/response standard for communication between computing devices. However, it should be noted that other communication protocols may be used to implement the request message, including File Transfer Protocol (FTP) or Simple Network Management Protocol (SNMP), among others. In a typical HTTP session comprising a sequence of network request/response transactions, host A 302 may initiate a request message that requests a resource and also attempts to establish a Transmission Control Protocol (TCP) connection to a particular port on host B 304.

In this illustrative example, host B 304 is a host computer that may provide resources to one or more other computers in a network of computers. Like host A 302, host B 304 may comprise any type of computer, including a server or a client computer, such as client 110, 112, or 114 in FIG. 1. In this example, host B 304 is a target host computer located behind firewall 306 in a protected internal network. Host B 304 listens for a request message on a particular port. When host B 304 receives the request message, host B 304 may return a response message that comprises a payload that may include the requested resource, an error message, or some other information.

Firewall 306 is a device configured to block or permit access to resources in a network based on a set of rules or other security criteria. Firewall 306 may be implemented in either hardware or software, or a combination of both. Firewall 306 is positioned between host A 302, which is located in an external network, and host B 304, which is located in a protected internal network. As host B 304 is positioned behind firewall 306, all data packets comprising message requests entering or leaving host B 304 pass through firewall 306. Firewall 306 intercepts and examines each packet based on source IP address, destination IP address, source port, destination port, etc. to determine whether to allow the request to pass through the firewall to a target device. For example, host A 302 sends HTTP request message 310 to obtain a resource from host B 304. If request message 310 complies with the access control policy, firewall 306 forwards the message to host B 304, thereby providing host A 302 access to host B 304. Firewall 306 may keep a record that the requesting host is authenticated to access the target host in connection log 312 for set period of time. For example, in HTTP/0.9 and 1.0, the connection between the hosts may be closed after a single request/response pair. HTTP/1.1 provides a keep-alive-mechanism through which a connection may be reused for more than one request for a set period of time, and the hosts do not need to re-negotiate the TCP connection after the first request has been sent. The authentication may last until the requesting host discontinues the session or the requesting host fails to send another request to the target device within the certain period of time as measured by timer 314.

If request message 310 does not comply with the access control policy, firewall 306 blocks request message 310 and sends a response message 316 back to host A 302. Response message 316 may specify in the payload of the message the status of the connection initiated between requesting host A 302 and target host B 304. As known in the art, a response message may comprise data wrapped inside a message envelope that is compliant with the messaging infrastructure. When host A 302 receives response message 316, host A 302 examines response message 316 by unwrapping the message and extracting the payload of the message. The presence of certain words or values in the payload may reflect the status of the initiated connection between host A 302 and host B 304. For example, the inclusion of the term "firewall content" in the body of an HTTP response message 316 or an HTTP status code that starts with "4" may indicate to host A 302 that an exception error has occurred. An exception error is an unexpected condition occurring on a computer, such as the failure of the connection between host A 302 and target host B 304. Host A 302 may determine, based on the exception handling code 332, that request message 310 sent to host B 304 has been intercepted and blocked by firewall 306.

Host A 302 also comprises components that enable the host to automatically provide credentials to the firewall in order to authenticate the blocked host to the firewall without requiring any user intervention. Host A 302 comprises application 318 and subnet lookup table 320. Application 318 may be any application which generates and sends a request for a resource in another device, such as host B 304. Subnet lookup table 320 comprises a table stored locally at host A 302. The contents of subnet lookup table 320 may be generated and updated by a user at the requesting host. When host A 302 determines from the exception handling code 332 that request message 310 has been blocked by firewall 306, host A 302 may use subnet lookup table 320 to automatically obtain and provide credentials to firewall 306 to authenticate host A 302 to firewall 306. Credentials may include login information such as username and password, certificates, or any other authentication information that enables access to the target host. Host A 302 performs a lookup 322 of the needed credentials by iterating through the entries in subnet lookup table 320 to locate a table entry having an IP address and subnet mask matching the IP address and subnet mask of host B 304. Each row in subnet lookup table 320 represents a subnet, or a range of IP addresses. Host A 302 may search through subnet lookup table 320 to determine if the blocked target IP address falls in the range of any of the subnets in subnet lookup table 320. For example, host A 302 may begin at the first row in subnet lookup table 320. For each row, host A 302 applies the subnet mask to the target host IP address that was blocked by the firewall and tries to match the result against the subnet IP address in the table in a manner similar to how routers determine which interface to forward data packets to. The subnet mask describes which bits of an IP address are significant. So using the example table in FIG. 4, if host A 302 is looking up the credentials for target host IP address 9.42.65.1, host A 302 may pull the subnet mask from the first row. If the subnet mask is 255.255.255.0, it can be determined that the first 24 of 32 bits are significant. This means that for the target host IP address, the first portion 9.42.65 is significant, and the last portion 0.1 is not. Thus, the result of applying the subnet mask from the first row to the target host IP address is 9.42.65.0. Host A 302 may then try to match result 9.42.65.0 with the subnet IP address in that same row in the table. Since result 9.42.65.0 matches subnet mask in the first column, host A 302 has located a match; otherwise host A 302 will continued to the next row. (Although the example provided pertains to 32-bit IP addresses (IPv4), it should be noted that the aspects of the subnet lookup table may be applied to 128-bit addresses (IPV6) as well.)

When host A 302 locates a matching entry, host A 302 obtains the credentials associated with the matching IP address and subnet mask and sends these credentials in authentication request 324 to the blocked host B 304. The authentication request message is a specific request for authentication to access the target host and includes the credentials in the payload of the message. Firewall 306 intercepts the authentication request with the provided credentials, authenticates the requesting host, and returns authentication success response 326 to host A 302. As the requesting host is now authenticated to the firewall, the firewall allows a subsequent request message 328 from host A 302 to pass through the firewall to host B 304. Request message 328 may comprise the same content as request message 310 previously sent by host A 302. When host B 304 receives request message 328, host B 304 may return response message 330 that comprises a payload that may include the requested resource, an error message, or some other information.

FIG. 4 is a diagram of a subnet lookup table in accordance with the illustrative embodiments. Subnet lookup table 400 is an example of subnet lookup table 320 in FIG. 3. In this illustrative example, subnet lookup table 400 comprises a plurality of columns, including subnet address 402, subnet mask 404, username 406, and password 408. Each entry in subnet address column 402 comprises an Internet Protocol (IP) addresses and a subnet mask combination, wherein each IP address and subnet mask entry indicates the address of a particular target subnet. An IP address is a number that uniquely identifies devices, such as computers, on a network. A subnet mask is a number that defines a range of IP addresses that can be used to designate subnetworks, or subnets. A subnet mask hides, or "masks," the network of a system's IP address and leaves only the host part as the machine identifier.

A set of credentials is provided for each subnet entry. In this illustrative example, the credentials comprise login information that may be applied to a particular target host. For instance, each subnet entry has an associated username column 406 that specifies a login user name, and an associated login password 408. When a requesting host determines from the exception handling code that its request message to a target host has been blocked by a firewall, the requesting host uses the IP address and subnet mask known for the target host to perform a lookup of an entry in the subnet lookup table that matches the IP address and subnet mask combination of the target host. The requesting host locates a matching entry and gets the credentials in the username 406 and password 408 columns. The requesting host provides these credentials in an authentication request to the target host, which is intercepted by the firewall. As the requesting host is authenticated to the firewall, the firewall allows requests from the requesting host to pass through the firewall to the target host.

Firewall authentications may be handled by the requesting host in various ways. In one embodiment, the requesting host may respond to a connection failure response on an "as-needed" basis. In the "as-needed" case, each time the requesting host determines that an outgoing connection request has failed, the requesting host may perform a look up to its subnet lookup table to determine if any of the entries match the address information of the target host. If a match exists, then a new request is made to the firewall with the credentials associated with the matched entry.

FIG. 5 illustrates exemplary source code for handling firewall authentications on an "as-needed" basis in accordance with the illustrative embodiments. In this example, source code 500 specifies two ways in which a requesting host may determine that its request to a target host has been blocked by a firewall. Section 502 specifies that if the body of a response received at the requesting host contains "firewall content", the requesting host may determine that the host's request to a target host has been blocked by a firewall. Section 504 specifies that if the connection between the requesting host and the target host has timed out, the requesting host may determine that the host's request to a target host has been blocked by a firewall. The connection between the requesting host and the target host may time out if the requesting host fails to send another request to the target device within a certain period of time as measured by timer 314 in FIG. 3.

Regardless of how the requesting host makes the determination that the firewall has blocked its request, section 506 of source code 500 specifies that if a request has been blocked by a firewall, the requesting host will obtain the needed credentials from the subnet lookup table. The requesting host will then initiate a connection to the target host by providing the credentials in an authentication request to the target host.

In another embodiment, the requesting host may respond to a connection failure response on an "up-front" basis. In the "up-front" case, the requesting application, such as application 318, may invoke a start handler, such as start handler 334 in FIG. 3. Start handler 334 is invoked by the requesting application when the deployment of the application is initiated. Start handler 334 is used to test the connectivity to one or more protected networks by sending a request to any host behind each firewall, which we will refer to as the "test host". So, for each entry in the subnet lookup table, the requesting startup handler can send a request to the first address in the subnet range. For example, using subnet lookup table 400 in FIG. 4, the requesting host may send a request to 9.42.65.1 and 9.54.0.1. If the requesting application is granted access to the test host by the firewall, then the requesting application may determine that the requesting host is connected to target hosts behind the firewall. However, if the requesting application is denied access to the host being tested, the requesting application may determine that its request has been blocked by the firewall. The requesting application may then obtain the needed credentials from the subnet lookup table for the subnet to which includes the host being tested. The requesting host will then initiate a connection to the test host by providing the credentials in an authentication request to the test host.

Figure 6A:
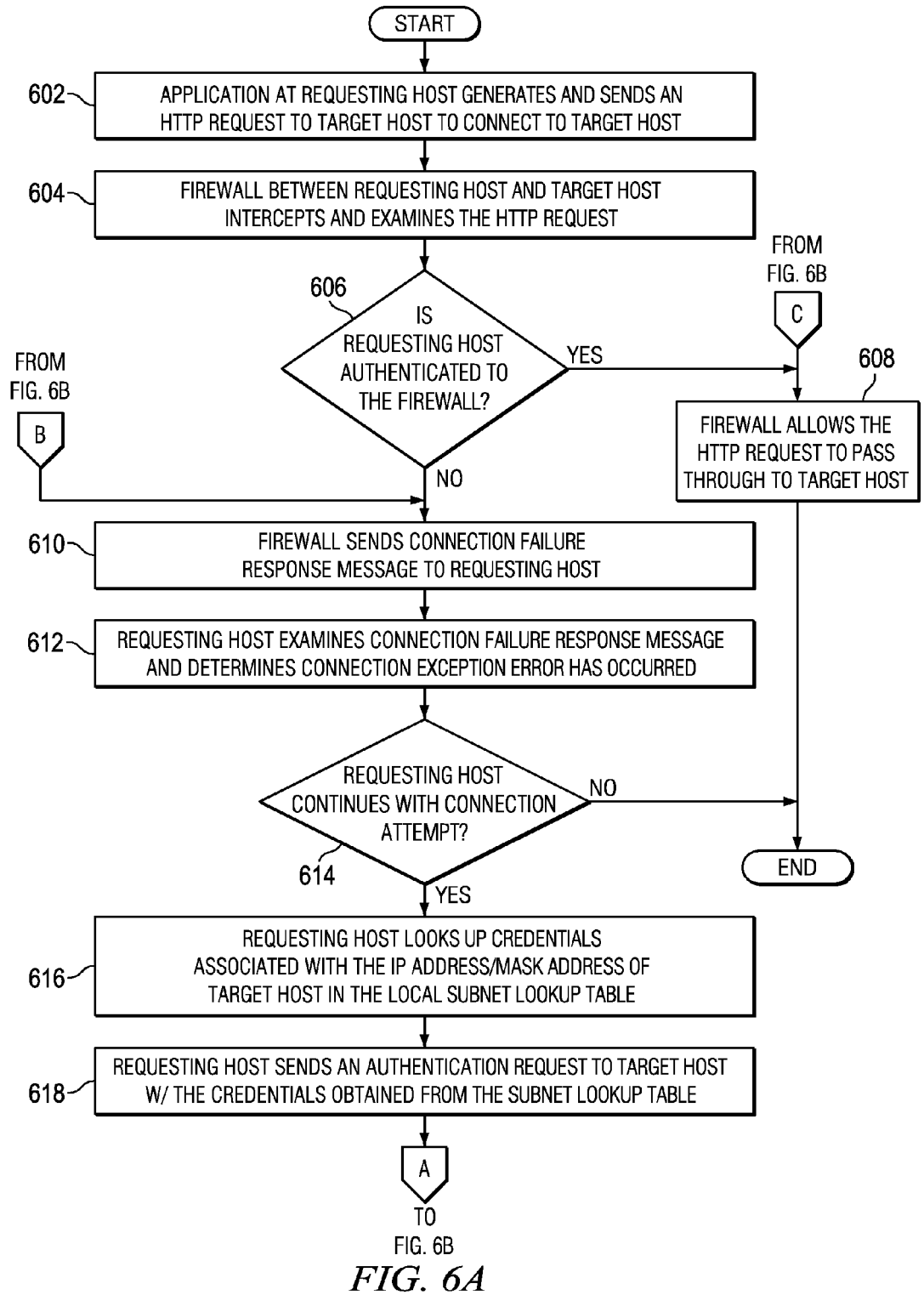
FIGS. 6A and 6B depict a flowchart of a process for authenticating a remote host to a firewall in accordance with the illustrative embodiments.
Figure 6B:
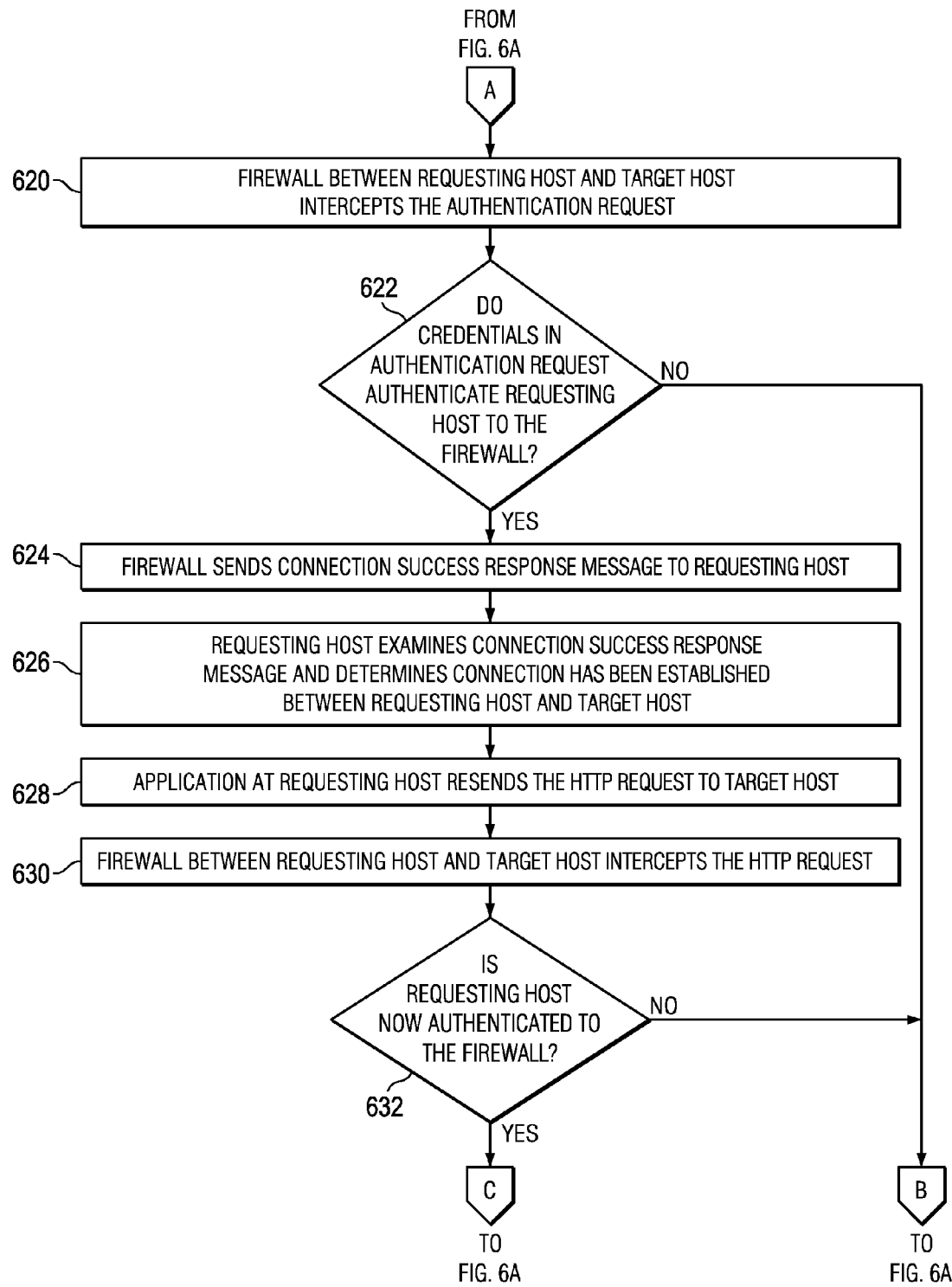

FIGS. 6A and 6B depict a flowchart of a process for authenticating a remote host to a firewall in accordance with the illustrative embodiments. The process described in FIG. 6 may be implemented in data processing system 300 in FIG. 3.

The process begins with an application at a requesting host, such a host A 302, generating and sending an HTTP request to a target host behind a firewall, such as host B 304 in FIG. 3 (step 602). The HTTP request from the requesting host is a request to access information at the target host. A firewall, such as firewall 306 in FIG. 3, intercepts and examines the HTTP request (step 604). The firewall makes a determination as to whether the requesting host is authenticated to the firewall (step 606). A requester is authenticated to the firewall if the host has presented credentials in the current (or a prior) request to the target host and the firewall has authenticated the credentials. If the firewall determines that the requesting host is authenticated to the firewall ('yes' output of step 606), the firewall allows the HTTP request to pass through the firewall to the target host (step 608), with the process terminating thereafter.

However, if the firewall determines that the requesting host is not authenticated to the firewall ('no' output of step 606), the firewall sends a connection failure response message to the requesting host (step 610). The requesting host examines the connection failure response and determines from the body of the response message that a connection exception error has occurred (step 612). A determination is then made by the requesting host as to whether to continue with the attempt to connect with the target host (step 614). If the requesting host determines not to continue with the connection attempt to the target host ('no' output of step 614), the process terminates thereafter. A requesting host may determine not to continue with the connection attempt if a previous attempt to provide credentials to the target host and firewall has failed.

If the requesting host determines to continue with the connection attempt to the target host ('yes' output of step 614), the requesting host looks up the credentials associated with the IP address and subnet mask combination of the target host in the subnet lookup table (step 616). The requesting host examines the entries in the subnet lookup table to locate an entry that matches the IP address and subnet mask combination of the target host. Once a matching entry is found, the requesting host obtains the credentials of the target host that are specified in the entry.

The requesting host then sends an authentication request that includes the obtained credentials to the target host (step 618). The firewall intercepts the authentication request (step 620) and makes a determination as to whether the credentials in the request authenticate the requesting host to the firewall (step 622). If the firewall determines that the credentials in the request do not properly authenticate the requesting host to the firewall ('no' output of step 622), the process continues to step 610 in which the firewall sends a connection failure response message to the requesting host. However, if the firewall determines that the credentials in the request authenticate the requesting host to the firewall ('yes' output of step 622), the firewall returns a connection success response message to the requesting host (step 624). Upon receiving the connection success response message, the requesting host examines the connection success response message and determines from the body of the response message that a connection between the requesting host and the target host has been established (step 626). The application at the requesting host resends the HTTP request to the target host (step 628). The firewall intercepts the request (step 630) and makes a determination as to whether the requesting host is authenticated to the firewall (step 632). If the requesting host is not authenticated to the firewall ('no' output of step 632), the process continues to step 610. For example, the connection between the requesting host and target host may be severed upon expiration of a timer. In this case, the requesting host is no longer authenticated to the firewall, and the firewall will subsequently block the request to the target host.

If the requesting host is still authenticated to the firewall ('yes' output of step 632), the firewall allows the HTTP request to pass through the firewall to the target host (step 608), with the process terminating thereafter.

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the disclosure has been presented for purposes of illustration and description, but is not intended to be exhaustive or limited to the embodiments of the disclosure in the forms disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The embodiments of the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the embodiments of the disclosure can take the form of a computer program product accessible from a computer readable medium providing program code for use by or in connection with a computer or any instruction execution system. For the purposes of this description, a computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAY) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the embodiments of the disclosure has been presented for purposes of illustration and description, and is not intended to be exhaustive or limited to the embodiments of the disclosure in the forms disclosed. Many modifications and variations will be apparent to those of ordinary skill in the art. The embodiments were chosen and described in order to best explain the principles of the disclosure, the practical application, and to enable others of ordinary skill in the art to understand the disclosure for various embodiments with various modifications as are suited to the particular use contemplated.

What is claimed is:

1. A computer implemented method for authenticating a host computer to a firewall, the computer implemented method comprising:
    sending, by a requesting host computer, a request message to a target host computer, wherein the request message requests one or more resources from the target host computer, and wherein the requesting host computer and target host computer are separated by a firewall that intercepts messages sent to the target host computer;
    responsive to receiving, at the requesting host computer, a response message from the firewall, determining from a content of the response message that an exception error has occurred, wherein the exception error indicates that the request message has been blocked by the firewall;
    locating an entry in a subnet lookup table that matches a network address of the target host computer;
    obtaining, from the entry, credentials associated with the target host computer;
    sending an authentication request message comprising the credentials to the target host computer, wherein the authentication request message is intercepted by the firewall;
    responsive to receiving, at the requesting host computer, an authentication response message from the firewall, determining from a content of the authentication response message that the credentials in the authentication request message has been authenticated by the firewall; and
    sending, by the requesting host computer, the request message to the target host computer, wherein the request message passes through the firewall to the target host computer, and wherein the request message establishes a connection between the requesting host computer and the target host computer.

2. The computer implemented method of claim 1, wherein the subnet lookup table is stored locally at the requesting host.

3. The computer implemented method of claim 1, wherein a content of the subnet lookup table is created and maintained by a user at the requesting host.

4. The computer implemented method of claim 1, wherein an entry in the subnet lookup table comprises a network address of the target host and credentials for authenticating the requesting host to the firewall.

5. The computer implemented method of claim 4, wherein the network address of the target host comprises an internet protocol address and a subnet mask.

6. The computer implemented method of claim 4, wherein the credentials include login information comprising a user name and password combination.

7. The computer implemented method of claim 1, wherein determining from a content of the response message that an exception error has occurred further comprises:
    unwrapping the response message to extract a payload of the response message;
    examining a content of the payload; and
    responsive to identifying a presence of a particular value in the payload, determining the firewall has blocked the request message from the target host.

8. The computer implemented method of claim 5, wherein locating an entry in a subnet lookup table that matches a network address of the target host further comprises:
    iterating through entries in the subnet lookup table to locate a table entry having an internet protocol address and subnet mask matching the internet protocol address and a subnet mask of the target host.

9. The computer implemented method of claim 1, wherein locating an entry in a subnet lookup table that matches a network address of the target host is performed at a time the requesting host determines an exception error has occurred.

10. The computer implemented method of claim 1, wherein locating an entry in a subnet lookup table that matches a network address of the target host is performed upon deployment of an application in the requesting host when the application determines the firewall has blocked a request message between the requesting host and a test host behind the firewall.

11. The computer implemented method of claim 1, wherein the firewall maintains a log that specifies that the requesting host is authenticated to the firewall for a set period of time.

12. The computer implemented method of claim 11, wherein the set period of time is determined by expiration of a timer.

13. The computer implemented method of claim 1, wherein the request message is a Hypertext Transfer Protocol request.

14. An apparatus for authenticating a host computer to a firewall, comprising:
    a bus;
    a storage device connected to the bus, wherein the storage device contains computer usable code; and
    a processing unit connected to the bus, wherein the processing unit executes the computer usable code to send, by a requesting host computer, a request message to a target host computer, wherein the request message requests one or more resources from the target host computer, and wherein the requesting host computer and target host computer are separated by a firewall that intercepts messages sent to the target host computer; responsive to receiving, at the requesting host computer, a response message from the firewall, determine from a content of the response message that an exception error has occurred, wherein the exception error indicates that the request message has been blocked by the firewall; locate an entry in a subnet lookup table that matches a network address of the target host computer; obtain, from the entry, credentials associated with the target host computer; send an authentication request message comprising the credentials to the target host computer, wherein the authentication request message is intercepted by the firewall; responsive to receiving, at the requesting host computer, an authentication response message from the firewall, determine from a content of the authentication response message that the credentials in the authentication request message has been authenticated by the firewall; and send, by the requesting host computer, the request message to the target host computer, wherein the request message passes through the firewall to the target host computer, and wherein the request message establishes a connection between the requesting host computer and the target host computer.

15. A computer program product for authenticating a host computer to a firewall, the computer program product comprising:
- a computer readable storage device having computer readable program code stored thereon, the computer readable program code for execution by a computer, comprising:
- computer readable program code for sending, by a requesting host computer, a request message to a target host computer, wherein the request message requests one or more resources from the target host computer, and wherein the requesting host computer and target host computer are separated by a firewall that intercepts messages sent to the target host computer;
- computer readable program code for, responsive to receiving at the requesting host computer a response message from the firewall, determining from a content of the response message that an exception error has occurred, wherein the exception error indicates that the request message has been blocked by the firewall;
- computer readable program code for locating an entry in a subnet lookup table that matches a network address of the target host computer;
- computer readable program code for obtaining, from the entry, credentials associated with the target host computer;
- computer readable program code for sending an authentication request message comprising the credentials to the target host computer, wherein the authentication request message is intercepted by the firewall;
- computer readable program code for, responsive to receiving at the requesting host computer an authentication response message from the firewall, determining from a content of the authentication response message that the credentials in the authentication request message has been authenticated by the firewall; and
- computer readable program code for sending, by the requesting host computer, the request message to the target host computer, wherein the request message passes through the firewall to the target host computer, and wherein the request message establishes a connection between the requesting host computer and the target host computer.

16. The computer program product of claim 15, wherein the subnet lookup table is stored locally at the requesting host.

17. The computer program product of claim 15, wherein a content of the subnet lookup table is created and maintained by a user at the requesting host.

18. The computer program product of claim 15, wherein an entry in the subnet lookup table comprises a network address of the target host and credentials for authenticating the requesting host to the firewall, wherein the network address of the target host comprises an internet protocol address and a subnet mask, and wherein the credentials include login information comprising a user name and password combination.

19. The computer program product of claim 15, wherein the computer readable program code is stored in a computer readable storage medium in a data processing system, and wherein the computer readable program code is downloaded over a network from a remote data processing system.

20. The computer program product of claim 15, wherein the computer readable program code is stored in a computer readable storage medium in a server data processing system, and wherein the computer readable program code is downloaded over a network from a remote data processing system for use in a computer readable storage medium with the remote system.

* * * * *